L. G. EGGERS.
AUTOMATIC SAFETY BRAKE FOR AUTOMOBILES.
APPLICATION FILED AUG. 26, 1912.
1,072,841.
Patented Sept. 9, 1913.
2 SHEETS—SHEET 1.
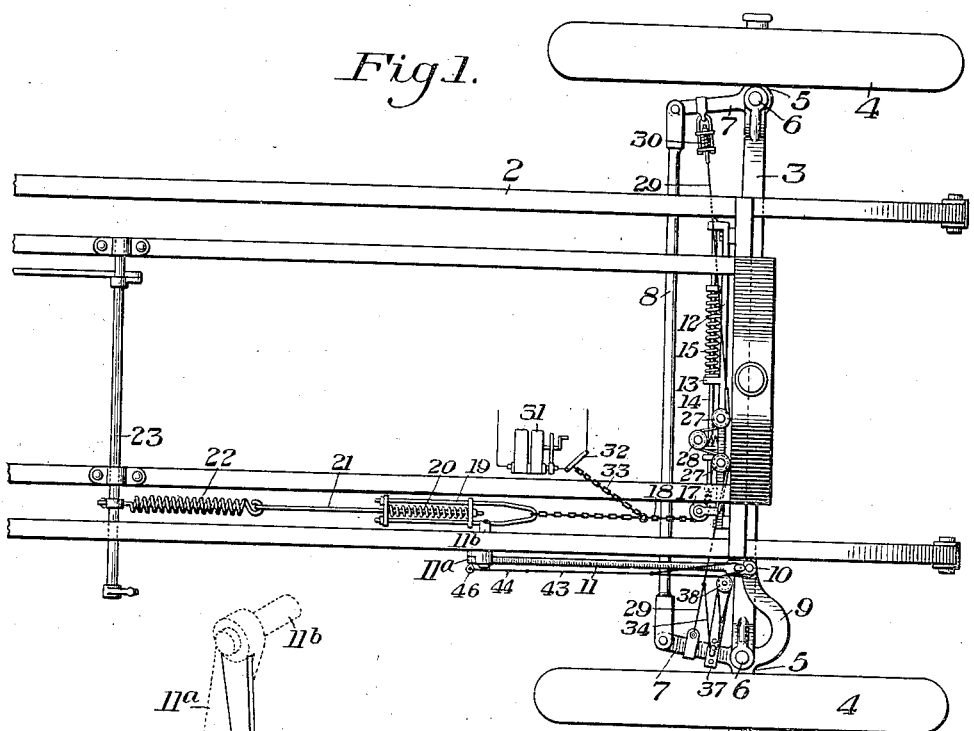
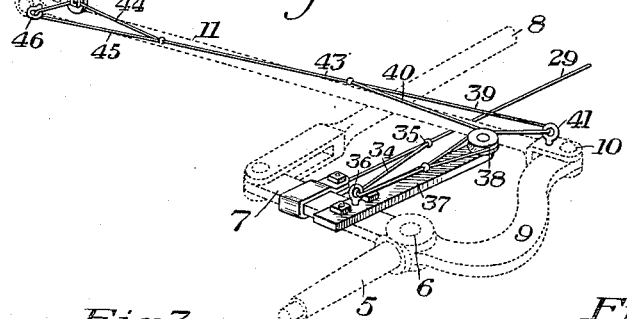
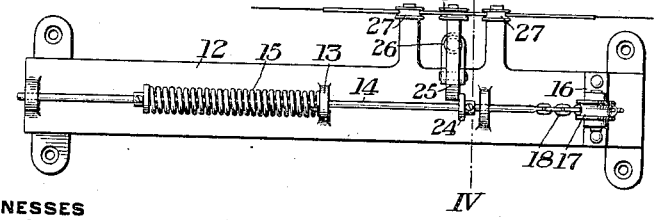
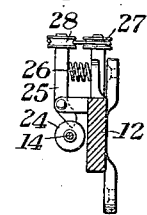
WITNESSES
INVENTOR
Lee G. Eggers,
by Bakewell, Byrnes & Parmelee,
attys.

L. G. EGGERS.
AUTOMATIC SAFETY BRAKE FOR AUTOMOBILES.
APPLICATION FILED AUG. 26, 1912.
1,072,841.
Patented Sept. 9, 1913.
2 SHEETS—SHEET 2.
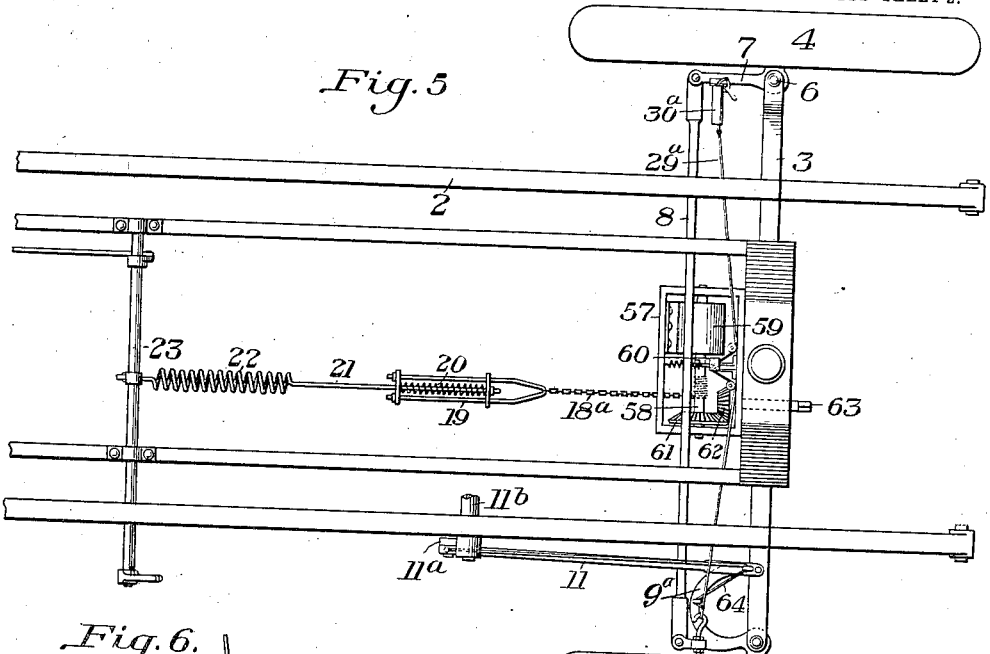
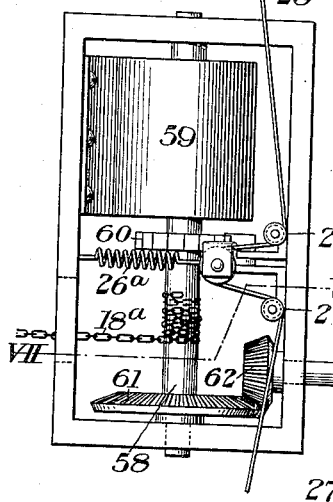
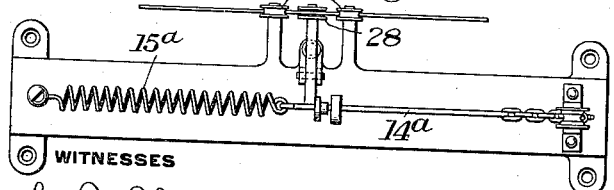
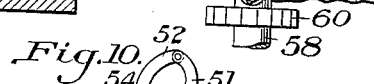
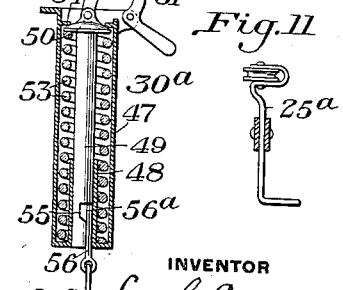

UNITED STATES PATENT OFFICE.

LEE G. EGGERS, OF MOUNT LEBANON, PENNSYLVANIA, ASSIGNOR TO ZEFFIE M. EGGERS, OF MOUNT LEBANON, PENNSYLVANIA.

AUTOMATIC SAFETY-BRAKE FOR AUTOMOBILES.

1,072,841.     Specification of Letters Patent.     Patented Sept. 9, 1913.

Application filed August 26, 1912. Serial No. 717,030.

*To all whom it may concern:*

Be it known that I, LEE G. EGGERS, a resident of Mount Lebanon, in the county of Allegheny and State of Pennsylvania, have invented a new and useful Improvement in Automatic Safety-Brakes for Automobiles, of which the following is a full, clear, and exact description, reference being had to the accompanying drawings, forming part of this specification, in which—

Figure 1 is a plan view of a portion of the running gear of an automobile, in which I have illustrated one form of my improved brake device; Fig. 2 is a perspective view of a portion of the mechanism shown in Fig. 1; Fig. 3 is a side elevation of the brake setting mechanism shown in Fig. 1; Fig. 4 is a detail sectional view on the line IV—IV of Fig. 3; Fig. 5 is a view similar to Fig. 1, showing a modified form of the device; Fig. 6 is an enlarged plan view of the brake-setting mechanism shown in Fig. 5; Fig. 7 is a sectional view on the line VII—VII of Fig. 6; Fig. 8 is a partial plan view of another modified form of brake-setting mechanism; Fig. 9 is a detail rear view of the brake-setting mechanism similar to that shown in Fig. 3, in which a tension spring is used in place of a compression spring; Fig. 10 is a sectional view through the releasing device shown in Fig. 5; and Fig. 11 is a detail view of the retaining device shown in Figs. 5 and 6.

My invention relates to a brake device for automobiles, and is designed to provide a cheap and efficient device of this character, which is adapted to automatically set the brake if the steering gear becomes disarranged.

Another object of my invention is to provide means for automatically shutting off the power to the automobile driving mechanism when the brake is set by the automatic brake mechanism.

The precise nature of my invention will be best understood by reference to the accompanying drawings, which will now be described, it being premised, however, that various changes may be made in the details of construction and general arrangement of the parts, without departing from the spirit and scope of my invention, as defined in the appended claims.

In the drawings, the numeral 2 designates the frame-work of the running gear of an automobile, and 3 the front or stationary axle.

4, 4 are the front wheels, which are rotatably mounted on short spindles 5, pivotally connected to the end of the axle 3 at 6. Rigidly connected to each of the spindles 5 and extending rearwardly therefrom is a lever arm 7. These lever arms are connected to each other by a link or connecting rod 8.

9 is a crank arm, which is connected to one of the spindles 5, and pivotally connected at 10 to the crank arm is the steering gear operating link 11, which is connected at its other end to a crank 11$^a$, which is in turn connected to a shaft 11$^b$ which is connected by means of gearing with a steering wheel, which is not shown.

12 is the frame of the brake-setting mechanism, which is connected to the front portion of the running gear frame at about the central portion thereof. Slidably mounted in projections 13 extending from the frame 12 is a rod 14, and surrounding the rod 14 is a compression spring 15 which is arranged to move the rod to set the brakes as hereinafter described. Journaled in a bracket 16 on the frame 12 is a roller 17, and 18 is a chain or other flexible connection connected to one end of the rod 14, and to a frame 19 having a spring 20. This frame 19 is also connected by means of a rod 21 with a spring 22, which is in turn connected to a brake-setting shaft 23. The chain or flexible connection 18 passes around the pulley 17, so as to rotate the brake-setting rod 23 through the various connections when the spring 15 is permitted to act to shift the rod 14.

The rod 14 is normally held in position shown in the drawings, by means of a retainer 24, which is connected to the rod 14, and is engaged by means of an arm 25 pivoted to lugs extending from the frame 12.

26 designates a spring, which engages projections on the frame 12 and the lever 25 to throw the upper end of the lever outwardly to disengage the lower end from the retainer 24.

27, 27 are rollers journaled on spindles extending upwardly from the frame 12, and 28 is a roller journaled on the upper end of the lever 25. 29 is a breakable wire, which is connected to one of the crank arms 7 and to a tension device 30, which is in turn connected to the other crank arm 7. This breakable wire passes around the rollers 27, 27, and the roller 28, and is designed to retain the lever 25 in the position shown in the drawings to prevent the rod 14 from being shifted by means of the spring.

It is well known to those familiar with the art, that if for any reason the steering gear connections between the front wheels should become disarranged or disconnected, the front wheels will diverge or converge. If the wheels diverge, the wire 29 will become slackened and thereby permit the spring 26 to act upon the lever 25 and release the rod 14 and permit the spring 15 to set the brakes. If the wheels should converge, there would be an undue tension on this wire, which would snap it and permit the brake to be set as above described.

31 designates the generator for the sparking device, and 32 designates a switch in the circuit of the sparking device.

33 designates a flexible connection from the switch 32 to the chain or flexible connection 18, the connections being such that the switch will be opened when the brake mechanism is set automatically, to cut off the current to the sparking device.

It will readily be understood by those familiar with the art that this connection 32 may operate any type of mechanism for cutting off the power to the motor of the automobile.

In order to provide means for automatically setting the brake, if the connections between the crank arm 11$^a$ and the crank 9 should become disconnected, I have connected a supplemental device to the breakable wire 29, which is arranged to break this wire when these connections become disconnected, and thereby automatically set the brake, even though the connections between the wheels has not been disconnected.

In one form I have shown a flexible member 34, which is connected at 35 to the breakable wire 29. This flexible member 34 should be considerably stronger than the breakable wire 29, and passes through an eye 36 on a bracket 37, which is connected to one of the crank arms 7.

38 is a roller journaled on the end of the arm 37, and 39 and 40 are flexible members connected to the flexible member 34. The flexible member 39 passes around the roller 38 and then through an eye 41, thence rearwardly, and is connected to another flexible member 43. The flexible member 40 passes around the roller 38, and is connected to the flexible member 43 at the junction of said member and the member 39. The other end of this flexible member 43 is connected to flexible members 44 and 45, the member 44 being connected to an extension which is secured to the crank 11$^a$ while the member 45 passes through a loop 46 on the end of the rod 11, and thence to an extension from the crank 11$^a$.

If the link 11 should become disconnected from the crank 11$^a$, the rearward movement of the crank 9 would draw the member 45 through the eye 46, which would place the member 43 under tension and through the medium of the members 39 and 40 would snap the breakable wire 29. If the crank 9 were moved forwardly when the connecting rod 11 is disconnected, the members 43 and 44 would be under tension, and through the medium of the members 39 and 40 would snap the breakable wire 29.

If the rod 11 should become disengaged from the crank 9, the rearward movement thereof would place the member 39 under tension and snap the wire 29, and if the crank 9 were moved forward the member 40 would be under tension and snap the wire 29.

In Figs. 5 to 7, I have shown a modified form in which the member 29$^a$ is connected in a similar manner, except that I have provided another form of tension member 30$^a$ to which one end of the member 29 is connected. This tension member comprises a tube 47 and an interior sleeve 48 connected thereto and concentric therewith, as shown in Fig. 10. Slidably mounted within the sleeve 48 is a plunger 49 having a head 50, which is connected to a lever 51, pivoted to lugs on the tube 47 by means of link 52.

53 designates a coil spring within the tube 47 and surrounding the plunger 49, and which engages the connecting member between the sleeve 48 and the tube 47 and the head 50, and is arranged to force the head 50 toward a projection 54 in the upper end of the tube 47, to take up the slack in the member 29$^a$. The lower end of the plunger 49 is provided with a recess 55, and 56 is a connecting link which is connected to one end of the member 29$^a$, and is provided with a head 56$^a$ which is seated within the recess 55.

If any undue strain is placed on the member 29$^a$ it will compress the spring 53 sufficiently to permit the head 56$^a$ to become disengaged from the plunger 49 and release the brake-setting mechanism, or if the member 29$^a$ becomes slack, due to the disarrangement of the steering gear, the spring 53 will force the plunger 49 in the reverse direction until the head 50 engages the flange 54, and as the spring is then stopped from taking up any further slack in the member 29ª, the brake-setting mechanism will be released as previously described.

In Fig. 5, I have shown another modified form of brake-setting mechanism, which comprises a supporting frame 57 connected to the front portion of the frame of the running gear, and 58 is a shaft journaled in the frame 57. Surrounding the shaft 58 is a spring 59, one end of which is connected to the casing or frame 57, while the other end is connected to the shaft 58 and is arranged to rotate the shaft to wind up the flexible member 18ª which is connected to the brake mechanism and set the brakes when the shaft 58 is rotated by means of this spring. Secured to the shaft 58 is a ratchet wheel 60, and pivotally connected to brackets extending from the frame 57 is a retaining lever 25ª, and 26ª is a spring for actuating the lever 25ª to release the ratchet wheel 60. The flexible member 29ª is connected to the brake-setting mechanism in a manner similar to that shown in Fig. 1. Connected to the shaft 58 is a bevel gear 61, which is in mesh with the bevel gear 62 on a shaft 63, which extends forwardly and is provided with a wrench seat on its end for rotating the shaft 58 against the action of the spring 59 when the brake-setting mechanism is reset.

In Fig. 8 I have shown a modified form of spring 59ª for actuating the shaft 58.

In Fig. 9 I have shown a brake-setting mechanism similar to that shown in Fig. 1, with the exception that I have shown a tension spring 15ª for actuating the rod 14ª.

In Fig. 5 I have also shown a flexible member 64 connected to the member 29ª, which is arranged to exert a pull on said member when the steering gear between the crank 9ª and the operating wheel becomes disarranged.

The advantages of my invention result from the provision of a mechanism for automatically setting the brake of an automobile, if the steering gear connections between the front wheels should break, bend or become disconnected. Further from the provision of means for releasing the brake setting mechanism to permit it to set the brakes, if the connecting rod between the steering wheel and the front wheels of the automobile should become disconnected. Further, from the provision of means for cutting off the power to the driving motor when the brake is automatically set.

I claim:

1. In a brake device for automobiles having steering gear, comprising brake setting mechanism, a retainer for said mechanism, a fracturable member connected to the retainer and the steering gear, and means for actuating the brake setting mechanism when the fracturable member breaks; substantially as described.

2. An automobile brake device for automobiles or the like having steering gear, comprising brake setting mechanism, means for actuating the brake setting mechanism, a retainer for the brake setting mechanism, and means for releasing said retainer by the breaking of the steering gear; substantially as described.

3. An automatic brake device for automobiles or the like having steering gear, comprising brake setting mechanism normally under tension, and means for releasing said mechanism when the steering gear becomes disarranged; substantially as described.

4. An automatic brake device for automobiles or the like having steering gear, comprising brake setting mechanism, a spring for setting said mechanism, a retainer for the brake setting mechanism, means for actuating said retainer to release the brake setting mechanism, means connected to the retainer and steering gear for holding the retainer in its set position, said holding means being arranged to release the retainer when the steering gear becomes disarranged; substantially as described.

5. An automatic brake applying device for automobiles having steering gear, said device being normally under tension, and connections between said device and the steering gear for releasing the brake applying device to permit it to apply the brake; substantially as described.

6. An automatic brake applying device for automobiles having steering gear, said device being normally under tension, and connections between said device and the steering gear for releasing the brake applying device to permit it to apply the brake, if the steering gear between the front wheels becomes disarranged; substantially as described.

7. An automatic brake applying device for automobiles having steering gear, said device being normally under tension, and connections between said device and the steering gear for releasing the brake applying device to permit it to apply the brake, if the connecting rod between the steering wheel and the front wheels is disconnected; substantially as described.

8. An automatic brake applying device for automobiles having steering gear, said device being normally under tension, connections between said device and the steering gear for releasing the brake applying device to permit it to apply the brake, and connections for stopping the motor when the brake is set; substantially as described.

9. In a brake device for automobiles, a spring actuated brake-setting device normally under tension, steering gear, a retaining device for holding the brake-setting mechanism under tension, a connection between the steering gear and the retaining device, and means for shifting said retaining device to permit the brake to be set when the steering gear becomes disarranged; substantially as described.

In testimony whereof, I have hereunto set my hand.

LEE G. EGGERS.

Witnesses:
 JESSE B. HELLER,
 GEO. B. BLEMING.